United States Patent Office 3,515,666
Patented June 2, 1970

3,515,666
METHOD OF TREATING AQUEOUS LIQUIDS AND COMPOSITIONS
Oliver M. Bacon, Cincinnati, Ohio, assignor to The Hunnewell Soap Company, Cincinnati, Ohio, a corporation of Ohio
No Drawing. Continuation-in-part of application Ser. No. 470,581, July 8, 1965. This application May 31, 1967, Ser. No. 642,307
Int. Cl. B01d 21/01
U.S. Cl. 210—52
8 Claims

ABSTRACT OF THE DISCLOSURE

This invention relates to an improved process for treating aqueous liquids to effect clarification thereof by forming a flocculent precipitate in said liquid and settling the floc so formed. The invention features improved coagulant aid compositions which are based on the matrix associated with phosphatic materials or, correspondingly, on phosphatic clays derived from low grade phosphatic materials. These are employed preferably in conjunction with known coagulant aids, such as polyelectrolytes and inorganic salts, such as sodium aluminate, ferrous and feric sulfates, and the like.

---

This invention is a continuation-in-part of my copending application Ser. No. 470,581, filed July 8, 1965, and now abandoned.

This invention relates to the treatment of aqueous fluids and to a composition for effecting such treatment. More particularly the present invention relates to an improved coagulation process for the removal of contaminants from water, wherein a novel coagulant aid is employed. The invention is thus concerned with water softening and clarification and with the provision of a composition of matter and a method which are useful for producing a flocculent precipitate in waters being subjected to softening or clarification. The invention further relates to compositions which have been discovered to possess excellent flocculating characteristics in the treatment of water by a coagulation process.

Water for municipal or industrial use, whether derived from rivers or other surface waters or from wells, is usually contaminated with silt or other finely divided particles of matter in suspension. Water, especially from wells, may also contain appreciable quantities of calcium and magnesium salts which form the "hardness" of the water and which are undesirable as scale-forming agents and as agents which interfere in many industrial processes where water is employed. Waste waters from domestic and industrial applications likewise require clarification before they may be discharged into rivers or other bodies of water.

The removal of these contaminants from water or other aqueous fluids presents an important problem and various methods have been developed for effecting their removal or reduction in water supplies. Among these, coagulation procedures have been extensively employed, especially for the removal of turbidity and color bodies when these are present in water in suspended form as finely divided particles. Such coagulation procedures, at the same time, are also effective in removing a large proportion of the bacteria from water. A further application of the coagulation process resides in the softening of water, as, for example, may be carried out by the well known limesoda process.

Coagulation procedures, whether used for softening or for clarification of water, depend upon the use of compounds known as coagulants, which may be used alone or in combinations. Such coagulant agents include, for example, alum or aluminum sulfate, sodium aluminate, ferrous or ferric salts, such as the chlorides or sulfates, lime, silicates, polyelectrolytes, both of natural origin and synthetic products, and colloidal clays of the bentonite type. These agents act by forming a flocculent precipitate in the aqueous system, the floc then carrying down the impurities with it as it settles. It is desirable in a coagulation process that the floc settle relatively rapidly and effect a clear-cut separation. It is of further importance that the floc be of such character that it can be handled, as in the course of its removal, without being disintegrated.

Accordingly, it is an object of this invention to provide a novel and improved process for the removal of contaminants from water or other aqueous fluids by a coagulation procedure.

It is a further object of the present invention to provide a process for clarifying water involving newly discovered flocculating agents.

A further object of the present invention resides in softening water by an improved coagulation process involving the step of adding novel coagulant aids thereto in small but effective amounts.

A still further object of the present invention is to provide a novel composition of matter effective as a coagulant aid in the clarification or softening of water by coagulation.

The invention is predicated on the discovery that the "matrix" surrounding pebble phosphate or phosphate rock, such as is found in Florida, has unexpectedly valuable and useful properties as a coagulant aid which favor its utilization as an adjunct to the softening and clarifying chemicals usually employed for the treatment of water or other aqueous fluids. This matrix, which is a colloidal clay rich in phosphorous pentoxide, is washed free from the pebble phosphate and is separated as a by-product in phosphate production. The matrix has been found also to possess flocculating properties when used alone. It characteristics are distinctly different from those of the bentonite clays and it is not to be confused with such clays.

As used herein the term matrix includes phosphate slime and phosphate sand as well as combinations of various clays that are contained in the material surrounding pebble phosphate or phosphate rock.

This invention also includes the use of phosphate rock per se, when suitably reduced to powdered form.

The invention also includes low grade phosphate rock or sand, having a phosphate content too low to be economically recovered, for example in the range of 1 to 3 percent. Such low grade phosphate rock or sand when ground to a fine particle size is suitable for use as the matrix in the coagulant compositions of the invention.

Although, as stated above, the matrix possesses coagulation properties when used alone, the objectives of the invention may be best achieved by the utilization of the matrix in conjunction with other known coagulants in suitable proportions as set forth. The presence of the matrix in the composition greatly increases the rate of settling of the floc produced and improves the efficiency of the clarification or softening process. It is effective also in reducing the quantity of chemicals required for clarification or softening thus lowering the cost of the process. As example, in a test carried out at a water plant in Omaha, effective clarification was achieved with treatment by 150 parts per million lime plus 5 parts per million of the composition of this invention, whereas prior treatment required the use of 200 parts per million lime and 200 parts per million alum.

The invention may be best described by the following specific examples showing the utilization of the matrix in compositions designed for the softening or clarification of water. All proportions shown are in parts by weight.

EXAMPLE I

| | Parts |
|---|---|
| Sodium aluminate | 100 |
| Anhydrous sodium metasilicate | 20 |
| Matrix | 100 |

The metasilicate and matrix are mixed together in dry form and the sodium aluminate is then incorporated in the mixture. The above composition is useful in softening water by coagulation and operates effectively at a relatively high pH value, in the region of pH 10 to 11.

It is understood that the specific quantities of ingredients disclosed in the above example are not limiting. Thus, suitable compositions may be formed using 25–180 parts sodium aluminate, 2–40 parts of the sodium metasilicate and 40–100 parts of the matrix.

EXAMPLE II

| | Parts |
|---|---|
| Ferric chloride | 35 |
| Matrix | 59 |
| A polyelectrolyte vegetable gum | 6 |

The above composition has excellent properties as a coagulant in the clarification of water, operating at relatively low pH values. Suitable vegetable gums are the guar type gums, a specific example which has been found satisfactory being Gar-Gum, Type M, made by Meer Corporation of New York. In place of the vegetable gum other known compatible polyelectrolyte compounds may be used including the synthetic products such as the polyacrylamides. Where the desired end product of treatment is potable water, natural vegetable gums are employed in the composition since they are more readily digestible. Likewise, ferric sulfate may be substituted for ferric chloride if desired and the corresponding ferrous salts may be used.

While the above composition is preferred, the ingredients of the composition may be varied within a range comprising 20–50 parts ferric chloride, 30–100 parts matrix, and 2–20 parts of the polyelectrolyte vegetable gum.

EXAMPLE III

| | Parts |
|---|---|
| Sodium aluminate | 25 |
| Matrix | 59 |
| Polyelectrolyte vegetable gum | 6 |

The above composition is suited for the treatment of water in a water plant, where it may be used alone or, for example, in conjunction with alum. The range of effectiveness in the above composition comprises 15–180 parts sodium aluminate, 30–100 parts matrix and 2–20 parts vegetable gum or other compatible polyelectrolyte compound.

As noted, the above specific examples are not to be regarded as limiting. The proportion of ingredients employed in the compositions of the invention may be varied over a relatively wide range. The polyelectrolyte gums include such natural gums as carageenin, gum tragacanth, agar agar, alginates, guar gum and locust bean gum. Among the synthetic products are sodium carboxy-cellulose, polyacrylamides, ethyl celluloses and polyvinyl alcohols. A host of commercial products is available.

The inorganic constituents of the compositions may likewise be substituted by equivalents without departing from the spirit of the invention. The following compositions are definitive of the scope of the invention.

COMPOSITION A

| | Parts |
|---|---|
| Phosphate matrix or phosphatic clay | 50 to 150 |
| Polyelectrolyte | 1 to 16 |
| Sodium aluminate | 5 to 150 |

COMPOSITION B

| | Parts |
|---|---|
| Phosphate matrix or phosphatic clay | 50 to 150 |
| Polyelectrolyte | 1 to 16 |
| Ferrous or ferric sulfate | 5 to 150 |

COMPOSITION C

| | Parts |
|---|---|
| Phosphate matrix or phosphatic clay | 50 to 150 |
| Polyelectrolyte | 1 to 16 |
| Ammonium sulfate | 5 to 50 |
| Ferrous or ferric sulfate | 5 to 150 |

In a further modification of the invention, from 5 to 150 parts of sodium metasilicate may be added to any of the above compositions. Also, ferric chloride may be substituted for the sodium aluminate or ferrous and ferric sulfates in the above compositions. Likewise, the metallic salt may be substituted in part by one or more equivalent floc-forming salts, such as, for example, magnesium sulfate and the like.

A further delineation of the scope of the invention may be seen in the following:

COMPOSITION D

| | Parts |
|---|---|
| Phosphate matrix or phosphatic clay | 50 to 150 |
| Polyelectrolyte | 1 to 16 |
| Ferrous or ferric sulfate | 5 to 75 |
| Cab-O-Lite | 5 to 75 |
| Metasilicate | 5 to 150 |

The Cab-O-Lite is a commercial calcium metasilicate produced by the Cabot Corporation of Boston, Mass. It may be sulfonated or chlorinated and utilized with soda ash or other neutralizing agent to the desired pH value. The polyelectrolyte may be a digestible vegetable gum or any polyelectrolyte approved by the United States Department of Health, Education and Welfare as a food additive for treatment of potable water. The sodium metasilicate may be replaced by any alkali metal metasilicate, such as potassium metasilicate. The anhydrous form of the metasilicate is preferred.

Relatively small quantities of the above compositions are required for the effective treatment of water or other aqueous fluids in the clarification or softening thereof. The exact amounts to be used will depend upon a number of factors including the hardness of the water and the extent and nature of the contaminants.

In utilizing the compositions of the invention, they may be added to the water or liquid being treated either in dry powdered form or as a slurry previously prepared with a relatively small quantity of water.

It should be understood that various changes and modifications may be made, within the scope of the appended claims, without department from the spirit of the invention.

What is claimed is:

1. A coagulant composition for water treatment which comprises a mixture of a phosphate material selected from the group consisting of the phosphate containing matrix associated with pebble phosphate, said matrix being recovered as a by-product in phosphate production, phosphate rock and phosphate containing sand, an organic polyelectrolyte and a metallic salt selected from the group consisting of sodium aluminate, ferric chloride, ferrous sulfate, sodium metasilicate and calcium metasilicate.

2. A coagulant composition for water treatment which comprises a mixture of from 50 to 150 parts by weight of a phosphate material selected from the group consisting of the phosphate containing matrix associated with pebble phosphate, said matrix being recovered as a by-product in phosphate production, phosphate rock and phosphate containing sand, from 1 to 16 parts by weight of an organic polyelectrolyte and from 5 to 150 parts by weight of a metallic salt selected from the group consisting of sodium aluminate, ferric chloride, ferrous sulfate, sodium metasilicate and calcium metasilicate.

3. A coagulant composition for water treatment which comprises a mixture of from 50 to 150 parts by weight of a phosphate containing material selected from the group consisting of the phosphate containing matrix associated with pebble phosphate, said matrix being recovered as a by-product in phosphate production, phosphate rock and phosphate containing sand, from 1 to 16 parts by weight of organic polyelectrolyte, from 5 to 50 parts by weight of ammonium sulfate and from 5 to 150 parts by weight of metallic salt selected from the group consisting of sodium aluminate, ferric chloride, ferrous sulfate, sodium metasilicate and calcium metasilicate.

4. A coagulant composition for treating water as in claim 1 wherein the polyelectrolyte compound is a vegetable gum.

5. In the process of treating water, the step which comprises adding thereto the coagulant composition of claim 1 in small but effective amounts and separating the floc formed by the process from the water so treated.

6. In the process of treating water, the step which comprises adding thereto the coagulant composition of claim 3 in small but effective amounts and separating the floc thus formed from the water so treated.

7. A coagulant composition for water treatment which comprises a mixture of from 25 to 180 parts of sodium aluminate, from 2 to 40 parts of anhydrous sodium metasilicate and from 40 to 100 parts of the matrix surrounding the pebble phosphate or phosphate rock which is washed free and separated from said pebble phosphate or phosphate rock, all parts being expressed in parts by weight.

8. A coagulant composition for water treatment which comprises a mixture of from 20 to 50 parts ferric chloride, from 30 to 100 parts of the matrix surrounding the pebble phosphate or phosphate rock which is washed free and separated from said pebble phosphate or phosphate rock and from 2 to 20 parts of polyelectrolyte compound, all in parts by weight.

References Cited

UNITED STATES PATENTS

| | | | |
|---|---|---|---|
| 2,381,514 | 8/1945 | Phelps | 210—51 X |
| 3,020,231 | 2/1962 | Colwell et al. | 210—54 |
| 3,066,095 | 11/1962 | Hronas | 210—53 |

FOREIGN PATENTS

| | | |
|---|---|---|
| 435,363 | 9/1935 | Great Britain. |

MICHAEL E. ROGERS, Primary Examiner

U.S. Cl. X.R.

252—175, 181